(12) United States Patent
Ohno

(10) Patent No.: US 7,743,273 B2
(45) Date of Patent: Jun. 22, 2010

(54) SERIAL COMMUNICATION SYSTEM AND METHOD FOR TRANSMITTING AND RECEIVING DATA IN SYNCHRONIZATION WITH A CLOCK SIGNAL

(75) Inventor: Toru Ohno, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 209 days.

(21) Appl. No.: 12/126,201

(22) Filed: May 23, 2008

(65) Prior Publication Data

US 2008/0294925 A1    Nov. 27, 2008

(30) Foreign Application Priority Data

May 25, 2007    (JP)    ............................. 2007-139552

(51) Int. Cl.
G06F 1/04    (2006.01)
(52) U.S. Cl. .................. 713/600; 713/375; 713/400
(58) Field of Classification Search .............. 713/375, 713/400, 600
See application file for complete search history.

(56) References Cited

U.S. PATENT DOCUMENTS

| | | | |
|---|---|---|---|
| 4,615,017 A * | 9/1986 | Finlay et al. | ................. 713/400 |
| 5,966,409 A * | 10/1999 | Maeda et al. | ................. 375/295 |
| 6,539,489 B1 * | 3/2003 | Reinert | ........................ 713/400 |
| 6,715,095 B1 * | 3/2004 | Larsen et al. | ................. 713/600 |
| 7,062,586 B2 * | 6/2006 | Donlin et al. | ................. 710/305 |
| 7,085,874 B2 * | 8/2006 | Penton et al. | ................. 710/306 |

FOREIGN PATENT DOCUMENTS

| | | |
|---|---|---|
| JP | 5-22261 A | 1/1993 |
| JP | 9-93231 A | 4/1997 |
| JP | 11250008 A | 9/1999 |
| JP | 2000-115283 A | 4/2000 |
| JP | 2002-101076 A | 4/2002 |
| JP | 2002-351753 A | 12/2002 |
| JP | 2005-18160 A | 1/2005 |
| JP | 2005-20308 A | 1/2005 |
| JP | 2005-110019 A | 4/2005 |

* cited by examiner

Primary Examiner—Thuan N Du
(74) Attorney, Agent, or Firm—Sughrue Mion, PLLC

(57) ABSTRACT

In a serial communication system in which data is transmitted from a first unit to a second unit in synchronization with a clock signal, the mode of communication between the first and second units is switched between a first communication mode in which data is transmitted from the second unit to the first unit in synchronization with the clock signal, and a second communication mode in which a signal asynchronous to the clock signal is transmitted from the first unit to the second unit.

11 Claims, 8 Drawing Sheets

SERIAL COMMUNICATION SYSTEM AND METHOD FOR TRANSMITTING AND RECEIVING DATA IN SYNCHRONIZATION WITH A CLOCK SIGNAL

INCORPORATION BY REFERENCE

The disclosure of Japanese Patent Application No. 2007-139552 filed on May 25, 2007 including the specification, drawings and abstract is incorporated herein by reference in its entirety.

BACKGROUND OF THE INVENTION

1. Field of the Invention

This invention relates to serial communication system and serial communication method for transmitting and receiving data in synchronization with a clock signal.

2. Description of the Related Art

Conventionally, a serial communication system adapted to transmit and receive data in synchronization with a clock signal is able to recover from a communication error, or the like, if any, by using a handshake signal line as well as a clock signal line and a data signal line. On the other hand, a serial communication system as disclosed in, for example, Japanese Patent Application Publication No. 2000-115283 (JP-A-2000-115283) uses a clock signal line, rather than a dedicated handshake signal line, for outputting a handshake signal with which a sender unit gives a command for initialization of communications to a recipient unit.

However, since the system of the above-identified publication, JP-A-2000-115283, issues the command for initialization by causing the sender unit to send a clock signal with an increased number of clock pulses than normal, the system needs to be equipped with software and hardware arrangements for detecting changes in the periodicity of a signal that passes through the clock signal line, and the construction or configuration of the system is likely to be complicated.

SUMMARY OF THE INVENTION

The present invention provides serial communication system and serial communication method that can perform a handshake with a simple arrangement.

A serial communication system according to a first aspect of the invention includes: a first unit, a second unit, a synchronous data transmitter provided in the first unit and operable to transmit data in synchronization with a clock signal, a synchronous data receiver provided in the second unit and operable to receive the data transmitted by the synchronous data transmitter, a first receiver that receives a transmission signal of the second unit which is in synchronization with the clock signal, a first transmitter that transmits a transmission signal of the first unit, a second transmitter that transmits the transmission signal of the second unit which is in synchronization with the clock signal, a second receiver that receives the transmission signal of the first unit, and a controller that switches a mode of communication between the first unit and the second unit between a first communication mode in which communication is performed between the first receiver and the second transmitter, and a second communication mode in which communication is performed between the first transmitter and the second receiver.

The serial communication system as described above may further include a first switching device that switches between the first receiver and the first transmitter on a first hardware, and a second switching device that switches between the second receiver and the second transmitter on a second hardware. In this system, the controller may cause the first switching device to make a switch to the first receiver and cause the second switching device to make a switch to the second transmitter, so as to implement the first communication mode, and may cause the first switching device to make a switch to the first transmitter and cause the second switching device to make a switch to the second receivers so as to implement the second communication mode.

The controller may switch the mode of communication between the first communication mode and the second communication mode, according to a transmission speed at which data is transmitted from the synchronous data transmitter.

When the system is in the second communication mode, the synchronous data transmitter may transmit reprogramming data for reprogramming the second unit to the synchronous data receiver, or may transmit reprogramming data for reprogramming a third unit connected via communication lines to the second unit, to the synchronous data receiver.

A second aspect of the invention provides a communication method of a serial communication system in which a first unit and a second unit are connected to each other via a first communication line, a second communication line and a third communication line. According to the method, a clock signal is sent from the first unit to the second unit via the first communication line, and one of a first communication mode and a second communication mode is selected. In the case where the first communication mode is selected, data is transmitted from the first unit to the second unit via the second communication line in synchronization with the clock signal, and a transmission signal of the second unit is transmitted from the second unit to the first unit via the third communication line, in synchronization with the clock signal. In the case where the second communication mode is selected, reprogramming data is transmitted from the first unit to the second unit at a higher speed than that in the first communication mode, via the second communication line, in synchronization with the clock signal, and a handshake signal is transmitted from the first unit to the second unit via the third communication line, asynchronously to the clock signal.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Some embodiments of the invention will be described with reference to the accompanying drawings.

Figure 1:
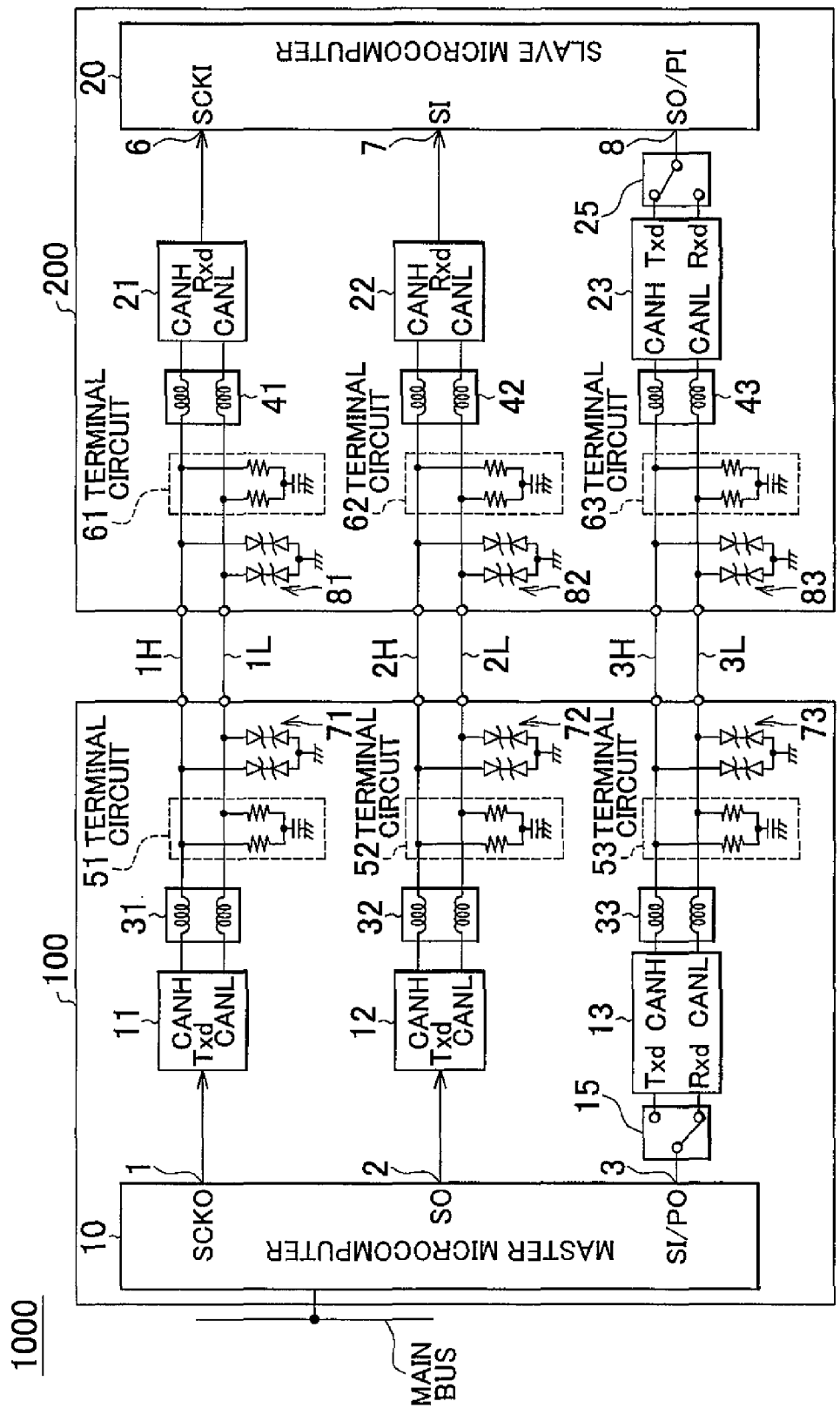
FIG. 1 is a view showing a hardware configuration of a serial communication system 1000 as a first embodiment of the invention.

FIG. 1 shows a hardware configuration of a serial communication system 1000 as one embodiment of the invention. The serial communication system 1000 has a master ECU 100 (hereinafter referred to as "master unit 100"), a slave ECU 200 (hereinafter referred to as "slave unit 200"), three pairs of communication lines, i.e., a first pair of communication lines 1H and 1L (which will, be generically called "first communication line"), a second pair of communication lines 2H and 2L (which will be generically called "second communication line"), and a third pair of communication lines 3H and 3L (which will be generically called "third communication line"), which connect the master unit 100 and the slave unit 200 with each other. The serial communication system 1000 is configured as a networked system in which the master unit 100 is connected to a main bus, whereas the slave unit 200 is not connected to the main bus. If the serial communication system 100 is installed on a vehicle, for example, the main bus corresponds to an in-vehicle LAN, such as a CAN network.

The master unit 100 and the slave unit 200 communicate with each other by sending and receiving data in synchronization with a clock signal. The serial communication system 1000 selects a mode of communication between the master unit 100 and the slave unit 200 from different communication modes, according to a requested operation mode. The serial communication system 100 has a normal mode in which data is transmitted and received in a normal manner between the master unit 100 and the slave unit 200, and a reprogramming mode in which the master unit 100 sends reprogramming data (or a rewriting program) to the slave unit 200, as its operation modes.

When the serial communication system 1000 operates in the normal mode, the first communication line is used as a signal line (clock signal line) through which a clock signal is transmitted from the master unit 100 to the slave unit 200, and the second communication line is used as a signal line (transmitted data signal line) through which transmission data is transmitted from the master unit 100 to the slave unit 200, while the third communication line is used as a signal hue (received data signal line) through which transmission data is transmitted from the slave unit 200 to the master unit 100.

Namely, in the normal mode, the master unit 100 sends a clock signal to the slave unit 200 via the first communication line, and sends certain transmission data to the slave unit 200 in synchronization with the clock signal via the second communication line. The slave unit 200 receives the transmitted data of the master unit 100 via the second communication line, in synchronization with the clock signal received via the first communication line. The slave unit 200 also transmits certain transmission data to the master unit 100 via the third communication line, in synchronization with the clock signal. The master unit 100 receives the transmitted data of the slave unit 200 via the third communication line, in synchronization with the clock signal.

When the serial communication system 1000 operates in the reprogramming mode, on the other hand, the first communication line is used as a clock signal line and the second communication line is used as a transmitted data signal line, while the third communication line is used as a signal line (handshake signal line) through which a handshake signal is transmitted from the master unit 100 to the slave unit 200.

Namely, in the reprogramming mode, the master unit 100 sends a clock signal to the slave device 200 via the first communication line, and sends certain transmission data to the slave device 200 via the second communication line, in synchronization with the clock signal. The slave unit 200 receives the transmitted data of the master unit 100 via the second communication line, in synchronization with the clock signal received via the first communication line. Also, the master unit 200 transmits a handshake signal to the slave unit 200 asynchronously to the clock signal, via the third communication line. The slave unit 200 receives the handshake signal asynchronous to the clock signal, via the third communication line.

The handshake signal corresponds to a command signal as a command issued by the master unit 100 for causing the slave device 200 to perform a certain control operation (such as an initializing operation, an operation to stop a program, or an operation to start a program). The slave unit 200 determines the content of the command of the master unit 100 from a signal state of the handshake signal, and executes a control operation in accordance with the content of the command.

The reprogramming data transmitted from the master unit 100 in the reprogramming mode has a greater data amount or volume than communication data transmitted from the master unit 100 in the normal mode. Therefore, the reprogramming data is transferred from the master unit 100 to the slave unit 200 at a higher speed or rate than that in the normal mode. For example, the transmission speed of 500 kbps in the normal mode is changed to the transmission speed of 1 Mbps in the reprogramming mode. As a result, even a large amount of reprogramming data can be transferred in a relatively short time. However, if the transmission speed is increased, a communication error, such as a hung-up, is likely to occur, particularly in the case where the system is used in a poor communication environment (for example, in the vicinity of a switching device, such as a DC-DC converter). Therefore, the serial communication system 1000 uses the third communication line as a received data signal line through which transmission data is transmitted from the slave unit 200 to the master unit 100 in the normal mode, and uses the third communication line as a handshake signal line through which a handshake signal is transmitted from the master unit 100 to the slave unit 200 in the reprogramming mode, as described above.

In the meantime, the master unit 100 is an electronic control unit that includes a master microcomputer 10 including a CPU (central processing unit) that performs computation and control operations, memory that stores data, I/O portion that does input and output of signals or data with the outside, and other components, and communication interface circuits for communication with the slave unit 200. Similarly, the slave unit 200 is an electronic control unit that includes a slave microcomputer 20 including a CPU, memory, I/O portion, and other components, and communication interface circuits for communication with the master unit 100.

The communication interface circuits of the master unit 100 and the slave unit 200 are provided for each communication line. Each of the communication interface circuits of the serial communication system 1000 uses a known hardware circuit for CAN communication, as a hardware circuit that achieves the above-described communication operations. In particular, the communication interface circuit connected to the third communication line is formed as a sending/ receiving circuit serving as a sending circuit and a receiving circuit, which permits bi-directional communications as described above with the operating mode switched between the normal mode and the reprogramming mode. The hardware circuit for CAN communication includes a CAN transceiver (CAN driver) 11, 12, 13, 21, 22, 23, choke coil 31, 32, 33, 41, 42, 43, terminal circuit 51, 52, 53, 61, 62, 63, and an antinoise circuit 71, 72, 73, 81, 82, 83. The use of the hardware circuit for CAN communication makes it possible to construct a two-wire differential bus as shown in FIG. 1, and improve the noise immunity in communications between the master unit 100 and the slave unit 200. While the hardware circuit for CAN communication is used as the hardware circuit in the serial communication system 1000, the system does not use the CAN communication protocol as its communication protocol.

Figure 2:
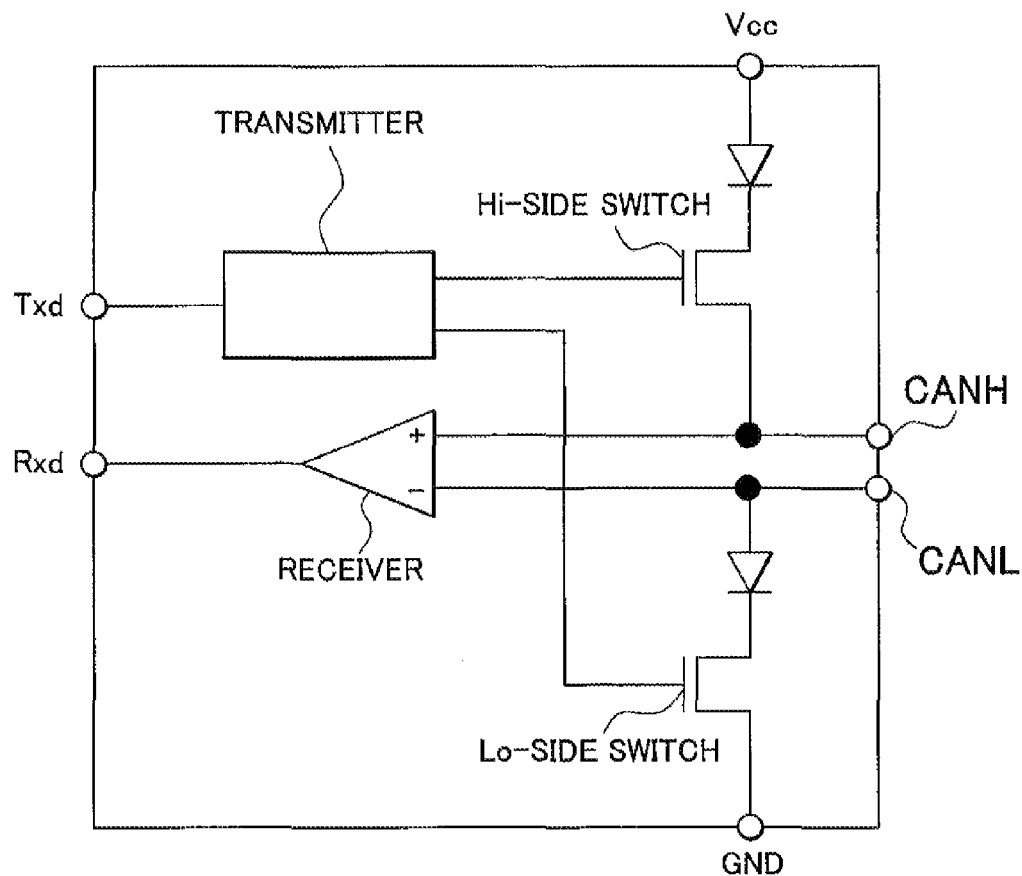
FIG. 2 is a block diagram of a transceiver.

FIG. 2 is a block diagram of the CAN transceiver. The CAN transceiver is an IC for an interface between a microcomputer and a communication line. Terminal CANH is a bus output terminal for Hi level, and terminal CANL is a bus output terminal for Lo level. Terminal Txd is a transmitted data input terminal connected to a communication output terminal of the microcomputer, and terminal Rxd is a received data output terminal connected to a communication input terminal of the microcomputer. Vcc is a power supply terminal, and GND is a ground terminal. A transmitter selectively turns on a Hi-side switch and Lo-side switch, based on the input from the terminal Txd, so as to output transmission data in the form of a differential signal via the terminal CANH and the terminal CANL. A receiver receives transmission data in the form of a differential signal from the terminal CANH and the terminal CANL, and outputs the received data to the terminal Rxd.

In FIG. 1, the terminal Txd of the transceiver 11 is connected to a port 1 of the master microcomputer 10, and the terminal Rxd of the transceiver 11 is not connected to the master microcomputer 10. The terminal Txd of the transceiver 12 is connected to a port 2 of the master microcomputer 10, and the terminal Rxd of the transceiver 12 is not connected to the master microcomputer 10. The terminal Txd of the transceiver 13 is connected to a port 3 of the master microcomputer 10 via a switching circuit 15, and the terminal Rxd of the transceiver 13 is connected to the port 3 of the master microcomputer 10 via the switching circuit 15. The port 3 is connected to a selected one of the terminals Txd and Rxd of the transceiver 13 through a switching operation of the switching circuit 15.

Also in FIG. 1, the terminal Rxd of the transceiver 21 is connected to a port 6 of the slave microcomputer 20, and the terminal Txd of the transceiver 21 is not connected to the slave microcomputer 20. The terminal Rxd of the transceiver 22 is connected to a port 7 of the slave microcomputer 20, and the terminal Txd of the transceiver 22 is not connected to the slave microcomputer 20. The terminal Rxd of the transceiver 23 is connected to a port 8 of the slave microcomputer 20 via a switching circuit 25, and the terminal Txd of the transceiver 23 is connected to the port 8 of the slave microcomputer 20 via the switching circuit 25. The port 8 is connected to a selected one of the terminals Txd and Rxd of the transceiver 23, through a switching operation of the switching circuit 25.

In the master microcomputer 10, the port 1 is a terminal to which the clock output function SCKO of outputting a clock signal is assigned, and the port 2 is a terminal to which the communication output function SO of outputting transmission data in synchronization with the clock signal is assigned, while the port 3 is a terminal to which a selected one of the communication input function SI of receiving transmission data in synchronization with the clock signal and the general-purpose output function PO of outputting a handshake signal is assigned.

In the slave microcomputer 20, on the other hand, the port 6 is a terminal to which the clock input function SCKI of receiving a clock signal is assigned, and the port 7 is a terminal to which the communication input function SI of receiving transmission data in synchronization with the clock signal is assigned, while the port 8 is a terminal to which a selected one of the communication output function SO of outputting transmission data in synchronization with the clock signal and the general-purpose input function PI of receiving a handshake signal is assigned.

Figure 7:
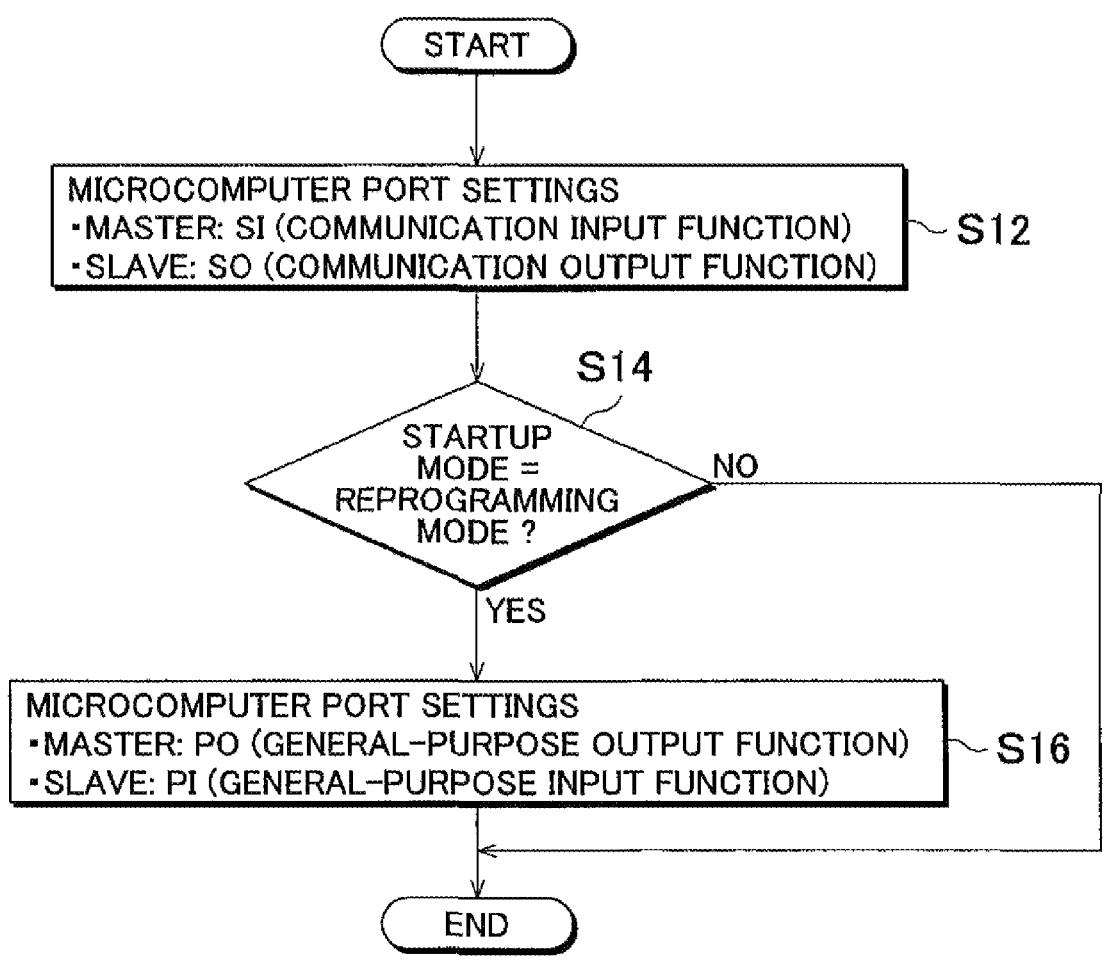
FIG. 7 is a flowchart illustrating a microcomputer port function setting process executed upon startup of the system.

FIG. 7 is a flowchart illustrating a microcomputer port function setting process executed upon startup of the system. When the master unit 100 and slave unit 200 are turned on, the master microcomputer 10 to which power is supplied assigns the communication input function SI to the port 3, as a default port setting (port setting in the normal mode), and the slave microcomputer 20 to which power is supplied assigns the communication output function SO to the port 8, as a default port setting (port setting in the normal mode) (step 12).

Figure 3:
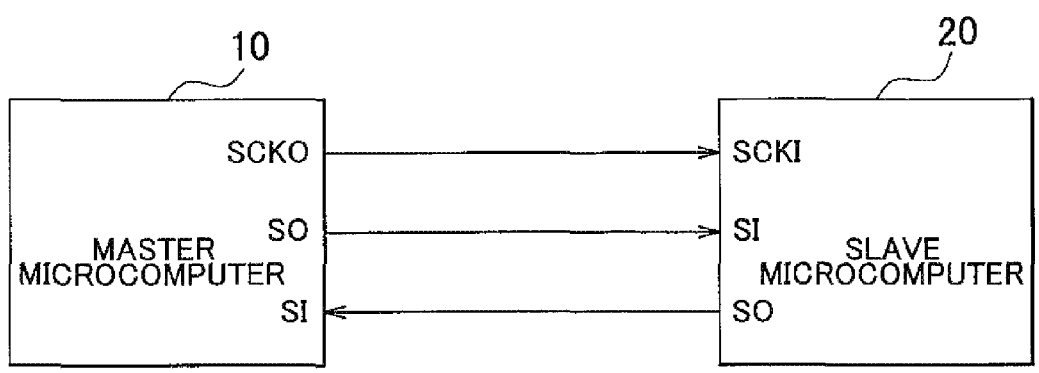
FIG. 3 is a schematic view showing the input/output relationships between a master microcomputer 10 and a slave microcomputer 20 in the normal mode.
Figure 4:
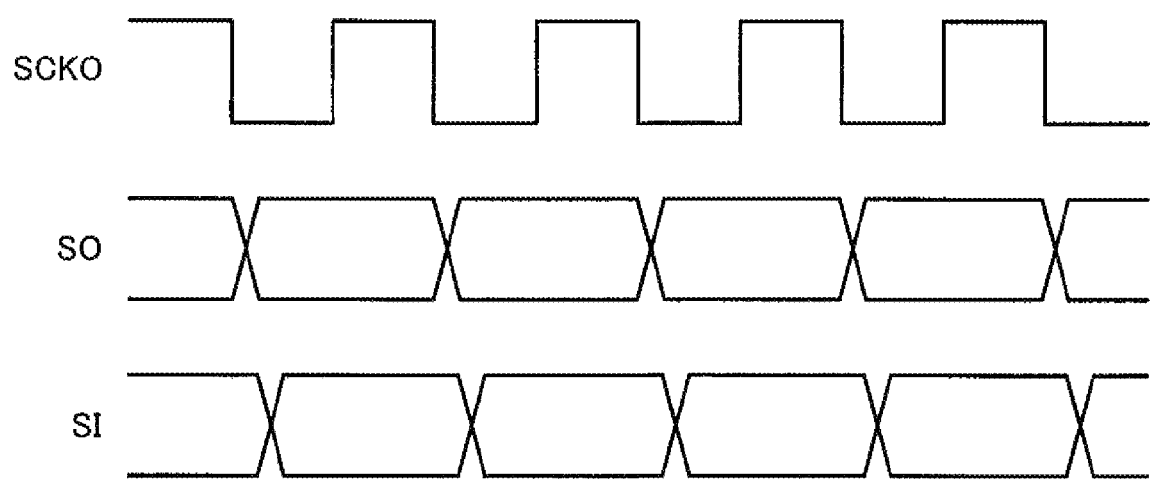
FIG. 4 is a view showing the port functions of the master microcomputer 10 in the normal mode and waveforms of signals associated with the respective ports.

By assigning the above-indicated functions to the ports 3, 8 in step 12, the input/output relationships between the master microcomputer 10 and the slave microcomputer 20 as shown in FIG. 3 are established. Accordingly, the master microcomputer 10 becomes able to receive transmission data from the slave microcomputer 20 in synchronization with the clock signal, and the slave microcomputer 20 becomes able to send transmission data to the master microcomputer 10 in synchronization with the clock signal while being able to receiving transmission data from the master microcomputer 10 in synchronization with the clock signal.

After the default port setting, the master microcomputer 10 determines whether the startup mode (operation mode) is the reprogramming mode (step 14). If the startup mode is not the reprogramming mode, the default port setting is maintained, and the process of FIG. 7 is finished. If the startup mode is the reprogramming mode, on the other hand, the master microcomputer 10 switches the function of the port 3 from the communication input function SI initially assigned to the port 3 to the general-purpose output function PO, and the slave microcomputer 20 switches the function of the port 8 from the communication output function SO initially assigned to the port 8 to the general-purpose input function PI (step 16), so that a normal condition can be resumed even if a communication error, or the like, occurs due to a high-speed transmission of reprogramming data.

The above-indicated step 16 of FIG. 7 will be further explained in detail with reference to FIG. 1. The master microcomputer 10, if it determines that the startup mode is the reprogramming mode, sends a reprogramming notifying signal that provides notification of entry into the reprogramming mode from the port 2 to which the communication output function SO is assigned. The slave microcomputer 20 that has received the reprogramming notifying signal sends a response signal (reprogramming response signal) from the port 8 to which the communication output function SO is assigned. After sending the reprogramming response signal, the slave microcomputer 20 switches the function of the port 8 from the communication output function SO to the general-purpose input function PI, and switches the destination to which the port 8 is connected from the terminal Txd to the terminal Rxd of the transceiver 23 by means of the switching circuit 25. Also, the master microcomputer 10 that has received the reprogramming response signal switches the function of the port 3 from the communication input function SI to the general-purpose output function PO, and switches the destination to which the port 3 is connected, from the terminal Rxd to the terminal Txd of the transceiver 13, by means of the switching circuit 15.

Figure 5:
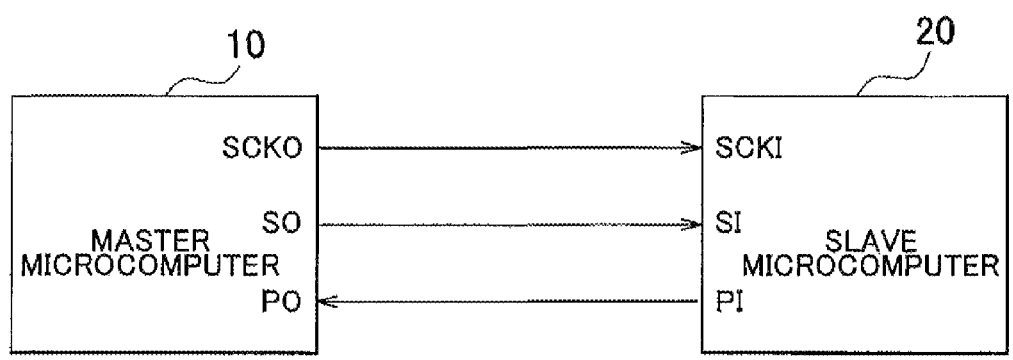
FIG. 5 is a schematic view showing the input/output relationships between the master microcomputer 10 and the slave microcomputer 20 in the reprogramming mode.

By setting the ports in the above manner in step 16, the input/output relationships between the master microcomputer 10 and the slave microcomputer 20 as shown in FIG. 5 are established. Accordingly, reprogramming data can be transmitted from the master unit 100 (the port 2 to which the communication output function of the master microcomputer 10 is assigned) to the slave unit 200 (the port 7 to which the communication input function SI of the slave microcomputer 20 is assigned), and a handshake signal can be transmitted from the master unit 100 (the port 3 to which the general-purpose output function PO of the master microcomputer 10 is assigned) to the slave unit 200 (the port 8 to which the general-purpose input function PI of the slave microcomputer 20 is assigned).

Figure 6:
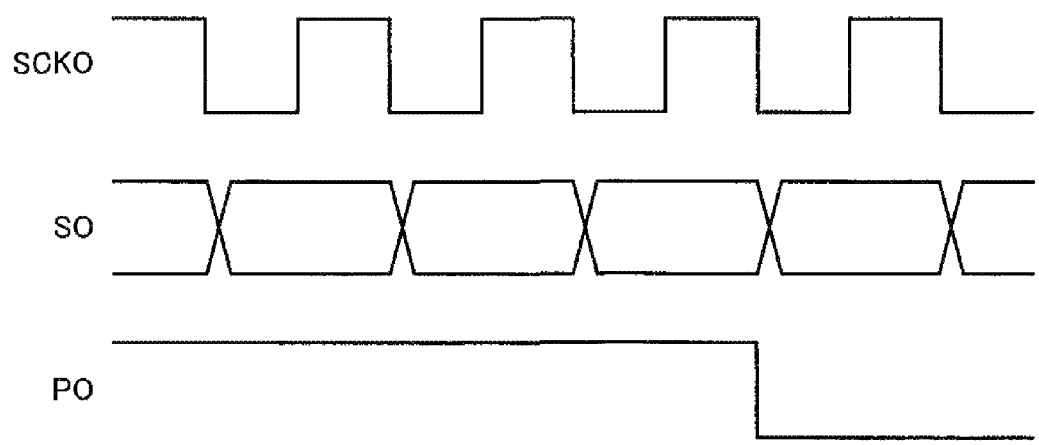
FIG. 6 is a view showing the port functions of the master microcomputer 10 in the reprogramming mode and waveforms of signals associated with the respective ports.
Figure 8:
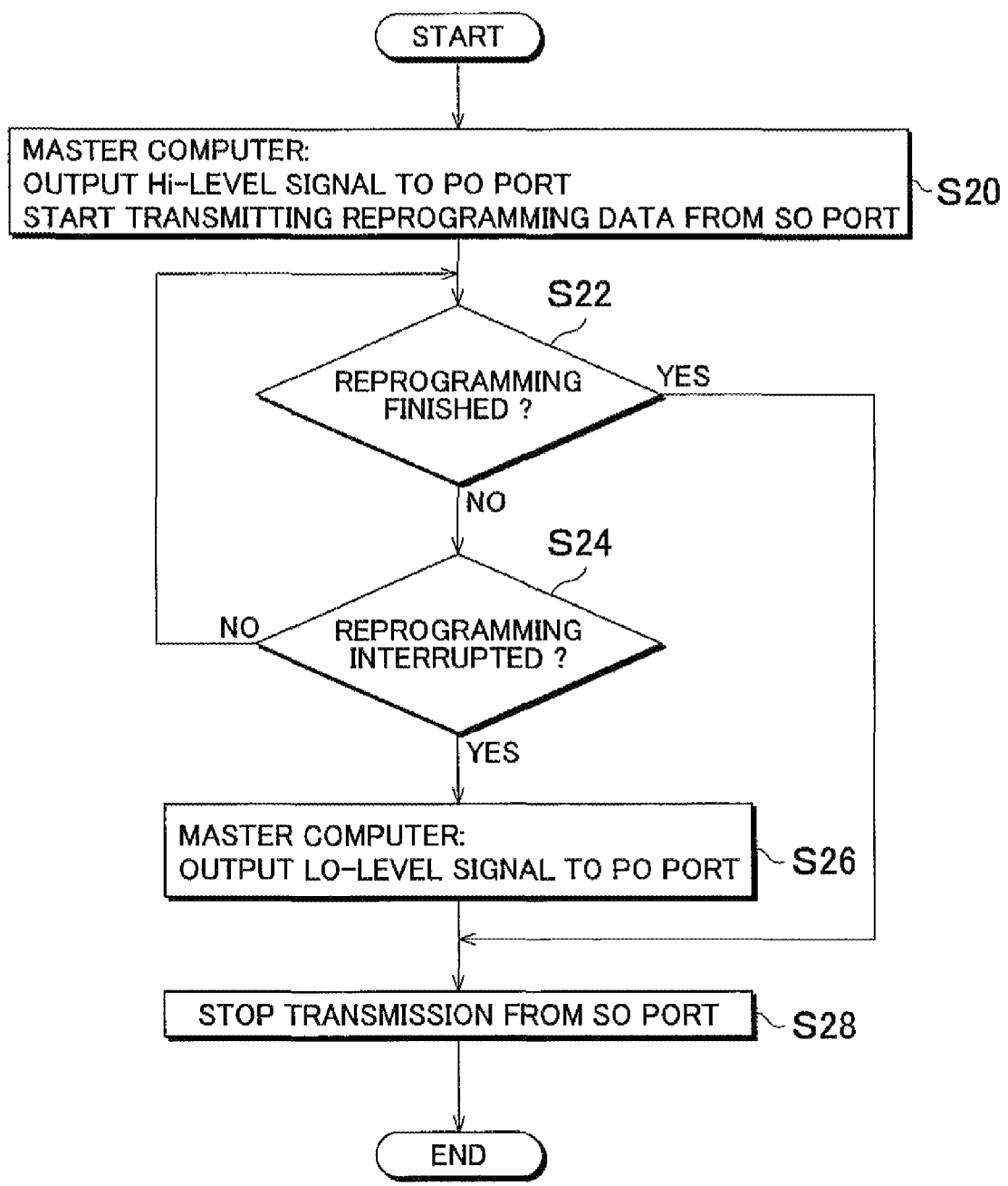
FIG. 8 is a flowchart illustrating a reprogramming process.

FIG. 8 is a flowchart illustrating a reprogramming operation performed by the master microcomputer 10. The master microcomputer 10 that has completed the port settings as shown in step 16 of FIG. 7 upon the entry into the reprogramming mode outputs a Hi-level handshake signal (for example, in a recessive state) to the port 3 to which the general-purpose output function PO is assigned, and starts sending reprogramming data from the port 2 to which the communication output function SO is assigned, as shown in FIG. 6 (step 20). When the Hi-level handshake signal is kept detected at the port 8 for a certain period of time, the slave microcomputer 20 is reprogrammed with reprogramming data received from the port 7.

Subsequently, if transmission of the reprogramming data is completed (Yes in step 22), the master microcomputer 10 stops transmission of the reprogramming data from the port 2 (step 28).

If, on the other hand, any factor responsible for interruption of reprogramming (for example, a communication error, such as a hung-up, or a request to stop transmission of reprogramming data) arises before transmission of reprogramming data is completed (YES in step 24), the master microcomputer 10 outputs a Lo-level handshake signal (for example, in a dominant state) to the port 3 to which the general-purpose output function PO is assigned (step 26), as shown in FIG. 6, and stops transmission of reprogramming data from the port 2 to which the communication output, function SO is assigned (step 28). When the Lo-level handshake signal is kept detected at the port 8 for a certain period of time, the slave microcomputer 20 is initialized, and reprogramming of the slave microcomputer 20 with the reprogramming data is stopped.

Even in the case where reprogramming of the slave microcomputer 20 with the reprogramming data is stopped, if the factor responsible for interruption of reprogramming is eliminated, the master microcomputer 10 outputs a Hi-level handshake signal according to step 20, and re-starts transmission of reprogramming data from the port 2 to which the communication output function SO is assigned. When the Hi-level handshake signal is kept detected at the port 8 for a certain period of time, the slave microcomputer 20 that has been initialized is reprogrammed again from the beginning with the reprogramming data.

Thus, the serial communication system 1000 capable of recovering from a communication error, or the like, using a handshake signal as well as a clock signal and a data signal, performs serial communications using the minimum number of communication lines. Even in the reprogramming mode in which a large amount of data is transferred at a high speed, the serial communication system 1000 only requires a simple arrangement for recovering from a communication error, such as a hung-up.

Figure 9:
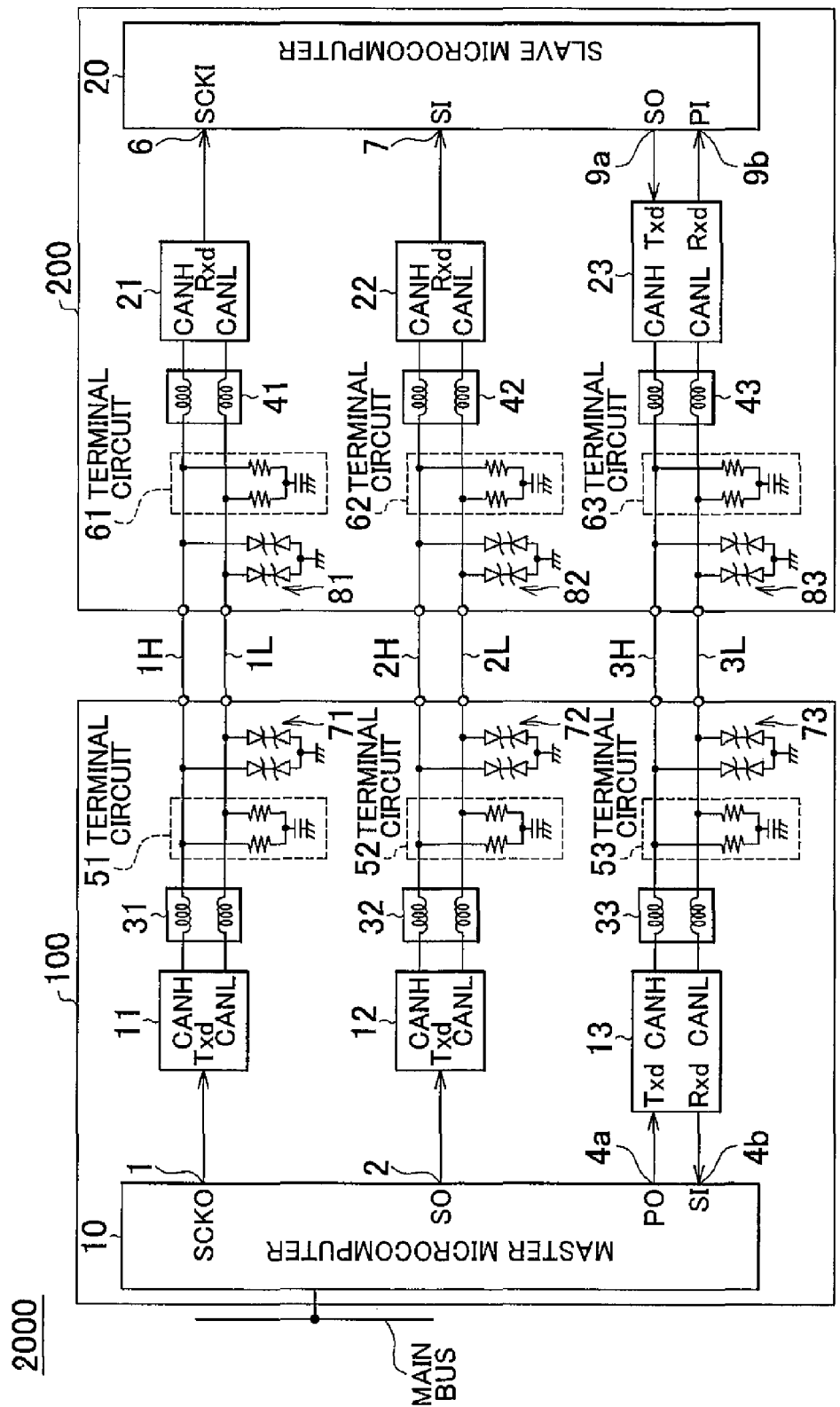
FIG. 9 is a view showing a hardware configuration of a serial communication system 2000 as a second embodiment of the invention.

FIG. 9 shows a hardware configuration of a serial communication system 2000 as a second embodiment of the invention. In FIG. 9, the same reference numerals as used in FIG. 1 are used for identifying the same constituent elements of the serial communication system 2000 as those of the serial communication system 1000, of which no further explanation will be provided. The serial communication system 2000 is different from the serial communication system 1000 with regard to the third communication line. More specifically, switching circuits between microcomputers and transceivers are eliminated in the serial communication system 2000.

In FIG. 9, the terminal Txd of the transceiver 13 is connected to a port 4a of the master microcomputer 10, and the terminal Rxd of the transceiver 13 is connected to a port 4b of the master microcomputer 10. Also, the terminal Txd of the transceiver 23 is connected to a port 9a of the slave microcomputer 20, and the terminal Rxd of the transceiver 23 is connected to a port 9b of the slave microcomputer 20.

In the master microcomputer 10, the port 4b is a terminal to which the communication input function SI of receiving transmission data in synchronization with a dock signal is assigned, and the port 4a is a terminal to which the general-purpose output function PO of outputting a handshake signal is assigned. In the slave microcomputer 20, on the other hand, the port 9a is a terminal to which the communication output, function SO of outputting transmission data in synchronization with a clock signal is assigned, and the port 9b is a terminal to which the general-purpose input function PI of receiving a handshake signal is assigned.

In the normal mode, communications is performed between the port 4b having the communication input function SI and the port 9a having the communication output function SO. In the reprogramming mode, communication is performed between the port 4a having the general-purpose output function PO and the port 9b having the general-purpose input function PI. In the serial communication system 1000 in which different functions are assigned to the same microcomputer port, the microcomputers 10, 20 themselves select the functions to be assigned to the ports 3, 8, respectively, while each of the switching circuits 15, 25 switches its communication path between two positions. In the serial communication system 2000 in which different functions are assigned to different microcomputer ports, the microcomputers 10, 20 themselves select the ports to be used for communication. The processes illustrated in the flowcharts of FIG. 7 and FIG. 8 may be similarly applied to the serial communication system 2000.

Thus, like the serial communication system 1000, the serial communication system 2000 performs serial communication with the minimum number of communication lines, and is able to recover from a communication error, such as a hung-up, with a simple arrangement, even when a large amount of data is transferred at a high speed, such as when the system operates in the reprogramming mode.

Also, with the serial communication systems 1000, 2000 constructed as described above, the time required for reprogramming can be reduced. Consequently, reprogramming can be accomplished with improved efficiency.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

For example, a slave unit (slave unit 300) that is not connected to the main bus may be connected to the slave unit 200 via communication lines. A hardware circuit similar to that of the slave unit 200 as shown in FIG. 1 or FIG. 9 is constructed in the slave unit 300. The slave unit 200 and the slave unit 300 are connected to each other via three pairs of communication lines similar to the communication lines connecting the master unit 100 with the slave unit 200 as shown in FIG. 1 or FIG. 9. The input/output relationships among the master microcomputer 10, slave microcomputer 20 and a slave microcomputer 90 of the slave unit 300 as shown in FIG. 10 are established.

With the above arrangement, communications can be performed between the slave unit 200 and the slave unit 300 in substantially the same manners as those in which communications are performed between the master unit 100 and the slave unit 200 when the system is in the normal mode and in the reprogramming mode. In the reprogramming mode, reprogramming data is transmitted from the master unit 100 to the slave unit 300 via the slave unit 200.

Figure 10:
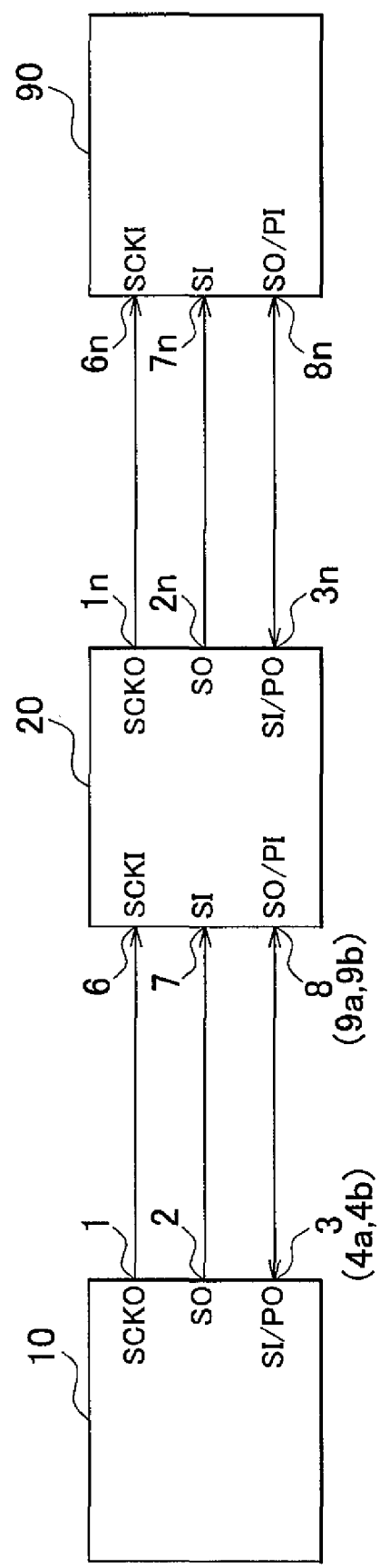
FIG. 10 is a schematic view showing the input/output relationships among the master microcomputer 10, slave microcomputer 20 and slave microcomputer 90.

In FIG. 10, the master microcomputer 10 that has determined the entry into the reprogramming mode outputs a Hi-level handshake signal to the port 3 to which the general-purpose output function PO is assigned, and outputs reprogramming data to the port 2 to which the communication output function SO is assigned. The slave microcomputer 20 that has received the Hi-level handshake signal and the reprogramming data outputs the Hi-level handshake signal to a port 3n to which the general-purpose output function PO is assigned, and outputs the reprogramming data to a port 2n to which the communication output function SO is assigned. When the Hi-level handshake signal is kept detected at a port 8n of the slave microcomputer 90 for a certain period of time, the slave microcomputer 90 is reprogrammed with the reprogramming data received from a port 7n.

Upon detection of any factor of interruption of reprogramming, on the other hand, the master microcomputer 10 outputs a Lo-level handshake signal to the port 3 to which the general-purpose output function PO is assigned, and stops transmission of reprogramming data from the port 2 having the communication output function SO. When the Lo-level handshake signal is kept detected at the port 8 for a certain period of time, the slave microcomputer 20 outputs the Lo-level handshake signal to the port 3n to which the general-purpose output function PO is assigned, and stops transmission of the reprogramming data from the port 2n having the communication output function SO. When the Lo-level handshake signal is kept detected at the port 8n for a certain period of time, the slave microcomputer 90 is initialized, and reprogramming of the slave microcomputer 90 with the reprogramming data is stopped.

Also, a slave unit (slave unit 400) that is not connected to the main bus may be connected to the slave unit 200 via communication lines, in parallel with the slave unit 300, or may be connected to the slave unit 300 via communication lines. In these cases, too, when the system operates in the reprogramming mode, reprogramming data can be transmitted from the master unit 100 to the slave unit 400.

What is claimed is:

1. A serial communication system, comprising:
 a first unit including a master microcomputer that includes a clock signal output port that outputs a clock signal, and a synchronous data transmission port that transmits data in synchronization with the clock signal;
 a second unit including a slave microcomputer that includes a clock signal input port to which the clock signal in input, and a synchronous data receiving port that receives the data transmitted from the synchronous data transmission port in synchronization with the clock signal; wherein:
 the master microcomputer includes a first function switching port whose function is selectively set to one of a first receiving function that receives the data in synchronization with the clock signal, and a first transmission function that transmits a signal asynchronously to the clock signal;
 the slave microcomputer includes a second function switching port whose function is selectively set to one of a second transmission function that transmits the data in synchronization with the clock signal, and a second receiving function that receives the asynchronous signal;
 in a first operation mode in which the data is transmitted and received between the first unit and the second unit, the data is transmitted from the synchronous data transmission port to the synchronous data receiving port, and the data is transmitted from the second function switching port whose function is set to the second transmission function, to the first function switching port whose function is set to the first receiving function; and
 in a second operation mode in which the first unit transmits the data to the second unit at a higher transmission speed, and the asynchronous signal is transmitted from the first function switching port whose function is set to the first transmission function, to the second function switching port whose function is set to the second receiving function.

2. The serial communication system according to claim 1, wherein:
 the first unit includes first switching means for switching a destination to which the first function switching port whose function is set to the first receiving function to a receiving circuit, and for switching a destination to which the first function switching port whose function is set to the first transmission function to a sending circuit; and
 the second unit includes second switching means for switching a destination to which the second function switching port shoes function is set to the second receiving function to the receiving circuit, and for switching a destination to which the second function switching port whose function is set the second transmission to the sending circuit.

3. The serial communication system according to claim 1, wherein a notifying signal indicative of an entry into the second operation mode is sent from the synchronous data transmission port to the synchronous data receiving port.

4. The serial communication system according to claim 3, wherein a response signal indicative of a response to the notifying signal is sent from the second function switching port whose function is set to the second transmission function.

5. The serial communication system according to claim 4, wherein the second transmission function assigned to the second function switching port is switched to the second receiving function after the response signal is sent.

6. The serial communication system according to claim 5, wherein the first receiving function assigned to the first function switching port is switched to the first transmission function after the response signal is received.

7. The serial communication system according to claim 1, wherein the slave microcomputer performs a certain control operation based on a signal state of the asynchronous signal.

8. The serial communication system according to claim 7, wherein the signal state changes when a factor responsible for interruption of transmission of the data that is transmitted at the higher transmission speed arises.

9. The serial communication system according to claim 1, wherein the data that is transmitted at the higher transmission speed is reprogramming data.

10. The serial communication system according to claim 9, wherein the data that is transmitted at the higher transmission speed is reprogramming data of the second unit or a third unit that is connected via a communication line to the second unit.

11. The serial communication system according to claim 1, wherein at least one of the clock signal, the data transmitted between the synchronous data transmission port and the synchronous data receiving port, the data transmitted between the first function switching port and the second transmission function switching port, and the asynchronous signal is transmitted via a different bus.

* * * * *